June 8, 1965 W. CLARK 3,187,881
METHOD AND APPARATUS FOR ALIGNING ENDLESS BELTS
Filed July 23, 1962 2 Sheets-Sheet 1

INVENTOR.
WILLARD CLARK
BY
ATTORNEY
Duane C. Burton

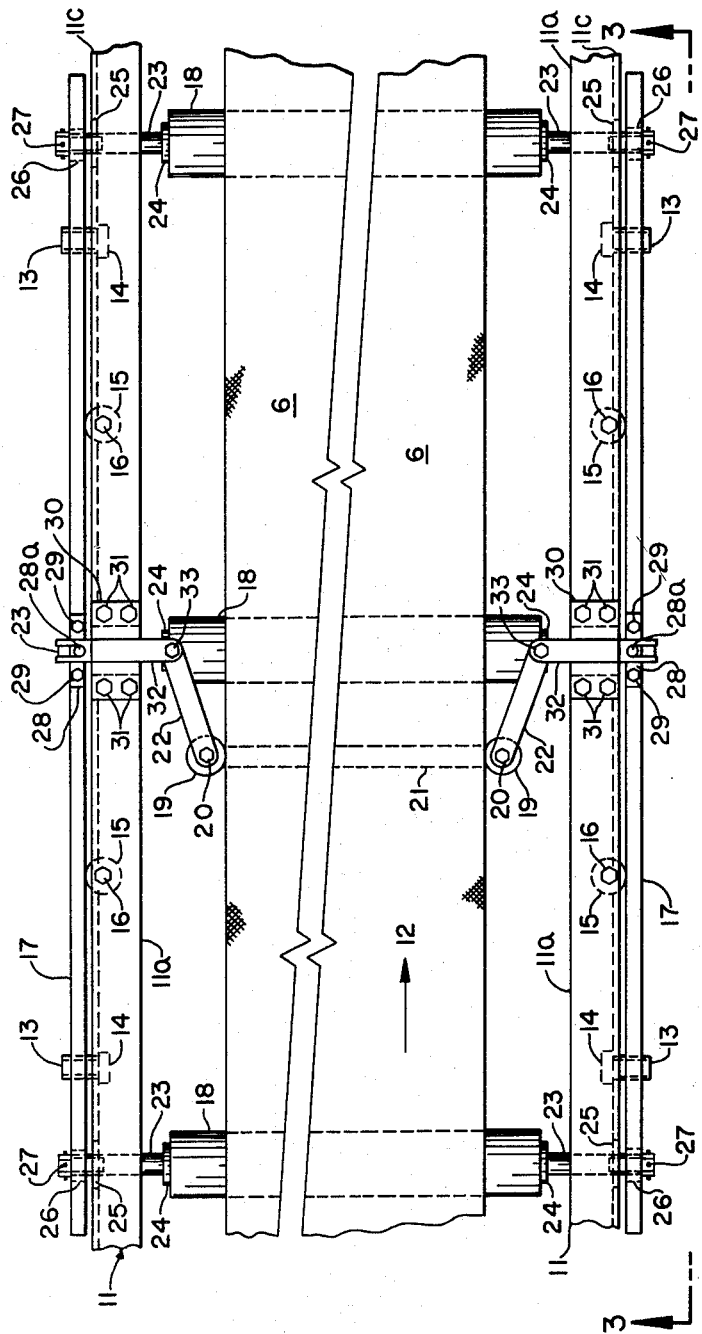

United States Patent Office 3,187,881
Patented June 8, 1965

3,187,881
METHOD AND APPARATUS FOR ALIGNING ENDLESS BELTS
Willard Clark, Parker, Ind., assignor to Ball Brothers Company Incorporated, Muncie, Ind., a corporation of Indiana
Filed July 23, 1962, Ser. No. 211,655
16 Claims. (Cl. 198—202)

This invention relates generally to a conveying apparatus and more particularly to a method and apparatus for aligning in a conveying apparatus a continuous or endless belt having a portion thereof under tension and another portion relatively tension free.

Conventional belt aligning apparatuses are designed for installation at and operation upon a portion of an endless belt which is subjected to a fairly high tensile stress. Deviations of the endless belt from its intended path of travel are normally sensed or corrected by positioning a movable device or a frustum, respectively, near the edges of the belt. An example of the former case is shown in U.S. Patent No. 2,533,473 while U.S. Patent No. 2,008,318 illustrates the latter case wherein the portion of the frustrum having the smallest diameter is positioned adjacent to the edges of the belt. Although both of the aforementioned types of apparatuses may be used to align an endless belt, it has been found that the life of the belt is greatly decreased where highly stressed belt edges are subjected to abrasive contact with the movable member or subjected to an even greater stress level as a result of riding upon the frustrum. This problem, serious enough under ordinary operating conditions, becomes extremely critical in certain applications. For example, an endless belt, portions of which are subjected to high tensile stresses, made from woven wire and used in a glass annealing lehr is exposed intermittently to room temperature outside the lehr and up to 1200° F. inside the lehr. Using conventional belt aligning appartus engageable with the tension side of the belt, the life of this belt was extremely short, seldom lasting more than five or six months unless the belt were visually observed and manually adjusted from time to time by adjusting the end rolls in the conventional manner. Since the cost of a new belt can amount to as much as one-half of the cost of the conveyor installation, replacement thereof is an item to be avoided as long as possible. It has been discovered, however, that in conveying apparatuses having endless belts which have both a taut portion and a relatively slack portion, the life of the belt can be more than doubled by installing a belt aligning appartus in and having it operate upon a relatively slack portion of the belt. Where belt aligning apparatuses containing one or more alignment rollers are used, said rollers being positioned beneath the slack portion of the belt, the rollers should be urged against the belt until a portion of the periphery of the rollers is above a portion of the upper surface of the slack portion of the belt and good results have been obtained where the belt is maintained in contact with 40° to 115° of the circular periphery of each of the rollers. Best results have been obtained where the belt is maintained in contact with 65° through 90° of the circular periphery of each of the rollers.

Accordingly, the primary object of this invention is to provide a method and apparatus for aligning endless belts having both a taut and a relatively slack portion.

Another object of this invention is to increase the life of endless belts having both taut and relatively slack portions by providing a method and apparatus for applying a corrective force to the belt at the slack portion thereof.

The foregoing and other objects and advantages will become more apparent from the specifications and accompanying drawings in which:

FIGURE 2 is a plan view of an apparatus for aligning endless belts or bands;

FIGURE 3 is an elevational view taken along line 3—3 of FIGURE 1;

Figure 1:
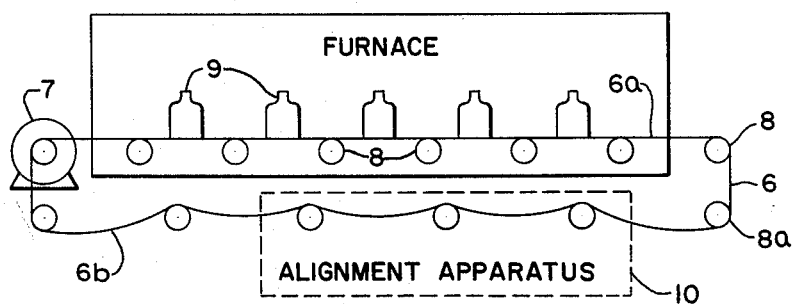
FIGURE 1 is a schematic view of a conveying apparatus having a belt aligning device positioned to operate upon a relatively slack portion of an endless belt contained within said apparatus.

Referring to the drawings, in FIGURE 1 a conveying apparatus, a portion of which is positioned within a furnace, is shown having an endles belt 6 which has an upper flight 6a under tension and a relatively slack lower flight 6b. A motor 7 drives the conveying apparatus. The upper flight 6a or taut portion is supported by a plurality of horizontally disposed, spaced-apart rollers 8. Only the taut portion 6a of the belt 6 is used to carry the work or articles 9. An alignment apparatus 10 is shown positioned in the relatively slack portion 6b of the belt and preferably not too far up-stream from roller 8a about which the belt 6 changes its direction of travel shortly before entering the lehr.

In FIGURE 2, a portion of the conveyor belt apparatus is shown comprising a pair of horizontally spaced-apart channel members 11 and an endless belt 6 disposed to travel therebetween in the direction indicated by the arrow 12. Each channel member is positioned with its two parallel web portions 11a and 11b horizontally disposed and directed toward the belt 6 so that the open side of both channel members face each other. Each of the channel members 11 have mounted therein three horizontally disposed roller members 13 longitudinally spaced apart along web portion 11c (FIGURE 2), said roller members 13 being mounted for rotation about the shanks of bolts 14 which extend through and outwardly from web portion 11c. Each of said channel members 11 also has two small vertically disposed roller members 15 mounted between the parallel web portions 11a and 11b on the shanks of bolts 16. A portion of each of the rollers 15 extends through and outwardly from the web portion 11c. Suitable means such as spacers or collars (not shown) are used to maintain the rollers 15 in a fixed relationship with respect to the longitudinal axis of the bolts 16.

An alignment apparatus comprising generally a pair of horizontally spaced-apart shift bars 17, three alignment or guide rollers 18 and a pair of vertically disposed rollers 19 mounted for rotation on bolts 20 is shown mounted on the conveyor belt apparatus portion. The rollers 19 are interconnected by a connecting or tie rod 21 positioned beneath the belt 6, and one of each is operatively connected to a respective one of the shift bars 17 through a shift lever 22 (FIGURE 3). The rollers 19 are preferably positioned in close proximity to the edges of said belt 6 in order to insure prompt application of a restoring force. One of each of the shift bars 17 is mounted for rolling engagement upon the three horizontally disposed rollers 13 and against the two small vertically disposed rollers 15, said sets of rollers being mounted in each of the channel members 11. The purpose of these two sets of rollers 13 and 15 is to hold to a minimum the amount of force required to move said shift bars 17. The alignment rollers 18 which extend generally transverse of and under the belt 6 are mounted for rotation on non-rotatable shafts 23 and about a substantially vertical axis located intermediate of the ends thereof or more precisely the ends of shafts 23. Shaft collars 24 disposed at each end of the alignment roller 18 prevent translatory movement of the roller 18 with respect to the shaft 23. Each end of the shaft 23 is formed hexagonally in cross-section. Said ends extend through aligned openings 25 and 26 formed, respectively, in each of the channel members 11 and shift bars 17. Both openings 25 and 26 are preferably generally rectangular in cross-section. The opening 26 formed in the shift bar 17 is slightly larger than the external dimensions of the end of the shaft 23 and is large enough to allow the shaft 23 to pivot or swing a predetermined angular amount in a horizontal plane in a manner and for a reason which will be described later. Good results have been obtained where a 1⅛-inch hexagonal shaft (the perpendicular distance measured between parallel sides of the hexagon) has been used in conjunction with an opening 26 in the shift bar 17 measuring 1 3/32 inches high by 1 5/16 inches wide and an opening 25 in the channel member 11 measuring 2 inches high by 4 inches wide. A cotter pin 27 is inserted through an opening formed in each end of the shafts 23 to insure that each shaft is always in proper operable relationship with the shift bars 17.

Each shift bar 17 has a T-shaped member 28 securely mounted on the upper surface and at about the midpoint thereof by suitable means such as threaded bolts 29. A portion 28a of the trunk of the T-shaped member 28 is cylindrically shaped and is mounted extending vertically upward from shift bar 17.

Each channel member 11 has a bracket 30 securely mounted on the upper surface thereof by suitable means such as threaded bolts 31, said bracket being formed in a channel or U-shape. Bracket 30 is positioned upon channel member 11 with the parallel walls thereof in contact with the upper surface of channel member 11 thereby forming an opening between channel member 11 and bracket 30, said opening extending transversely across web portion 11a. An elongated member 32 having an opening formed in one end thereof is shown welded on the upper surface of each bracket 30 with the end having the opening formed therein extending horizontally inwardly towards the belt 6.

Figure 4:
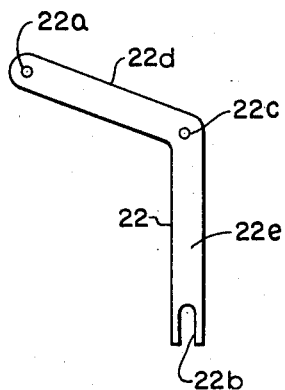
FIGURE 4 is a plan view of the shift lever used to connect the shift bar to the means for sensing deviation of the belt from its general path of travel.

As has already been described, the vertically disposed rollers 19, said rollers being used to sense deviations of the belt from its intended path of travel, are operably connected to the shift bars 17 through the shift levers 22. Each shift lever 22 has an opening 22a formed at one end and a bifurcated yoke 22b formed at the other end (FIGURE 4). Each shift lever 22 also has an opening 22c formed at the center or the intersection of the two arm portions 22d and 22e. Arm portion 22e is positioned beneath and spaced apart from elongated member 32 and within the opening formed between bracket 30 and web portion 11c, its opening 22c being positioned in vertical alignment with the opening formed in the end of elongated member 32. A fastener 33 is inserted through these two aligned openings. A collar (not shown) is mounted upon the shank of fastener 33 and maintains the two members in spaced-apart relationship. The bifurcated yoke portion 22b of shift lever 22 extends horizontally outward from the belt 6 and is positioned astraddle of the cylindrically-shaped portion 28a of T-shaped member 28. Each shift lever 22 is free to pivot or rotate in a horizontal plane about fastener 33. Both shift levers always rotate in the same direction at the same time, i.e., clockwise or counter-clockwise.

The conveyor belt 6 is shown in FIGURE 2 in its desired path of travel. If the belt 6 which is traveling in the direction indicated by the arrow 12 deviates from its desired path of travel to the right, as determined by facing in the same direction in which arrow 12 is pointing, belt 6 will come into contact with the vertically disposed roller 19 positioned to the right of the belt and cause said roller to move in a counterclockwise direction about fastener 33. Since the vertically-disposed rollers 19 are interconnected by tie rod 21, and since both rollers 19 always rotate in the same direction at the same time, the roller positioned to the left of the belt will likewise rotate in a counter-clockwise direction. The movement of these rollers 19 is transmitted through shift levers 22 to the vertically-disposed, cylindrically-shaped portions 28a of T-shaped members 28. Since each T-shaped member 28 is firmly mounted on a respective one of the shift bars 17, each shift bar moves in response to the rotation of shift levers 22. With the mounting arrangement shown in FIGURE 2, the shift bars 17 are substantially confined to translatory movement while the shift levers 22 are confined to rotary movement. When the belt deviates to the right, the shift bar 17 located to the right of the belt moves forward in the direction indicated by the arrow 12. At the same time, the shift bar located to the left of the belt will move backwards or in the direction opposite to that indicated by the arrow 12. Movement of the shift bars in this manner causes all three alignment or guide rollers 18 simultaneously to change their angular relationship with respect to the longitudinal axis of the belt whereby the right ends of each of the rollers 18 move forward and the left ends move backwards. Thus, the ends of the rollers 18 will move in the same general direction as that of the nearest shift bar 17. Movement of the alignment rollers 18 in this manner takes up the slack on the right side of the belt and imparts slackness on the left side of the belt resulting in the lateral shifting of the belt to the left until it returns to the desired path of travel. Once the belt has returned to its intended path of travel it will no longer be in contact with either of the belt deviation sensing rollers 19 and consequently no correction force is applied to the belt. If the belt 6 were to deviate to the left from its desired path of travel, the apparatus would operate in much the same manner as just described except that the belt would come into contact with the vertically disposed roller 19 located to the left of the belt, rollers 19 would move about fasteners 33 in a clockwise direction, the left shift bar 17 and the left ends of shafts 23 would move forward while the right shift bar 17 and the right ends of shafts 23 would move backwards, and the belt would move to the right until it had returned to its intended path of travel.

Figure 5:
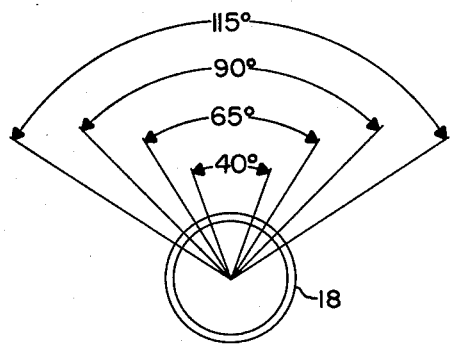
FIGURE 5 is an end view of one alignment roller showing the belt-alignment roller contact relationship.

For efficient operation, a certain belt-to-alignment roller contact should be maintained. The amount of contact depends in part upon the weight of the belt material. However, for most applications, it has been found that the contact should be sufficient to maintain a portion of the periphery of the alignment roller above the upper surface of the slack portion of the belt. Good results have been obtained where each roller has at least 40° of its circular periphery in substantially continuous contact with the belt and under most applications, the belt-to-roller contact seldom exceeds 115° of the periphery of the roller. Best results have been obtained when each roller has between 65° and 90° of its circular periphery in contact with the belt. FIGURE 5 shows generally these angular relationships.

An apparatus constructed generally as shown in FIGURE 2 and having three alignment rollers spaced on 27-inch centers has been able to keep a woven wire belt weighing approximately 5½ pounds per square foot in good alignment for far more than six months without the edges of the belt showing any signs of wear. This particular alignment apparatus was installed approximately 7 feet upstream from the roller 8a (FIGURE 1).

From the foregoing it will readily be apparent that an endless belt having a taut portion and a relatively slack portion may be aligned by lifting and supporting successive transverse segments of the slack portion of the belt and changing the direction of travel of these segments to return the belt to a desired path of travel. In other words, such a belt may be aligned by urging or maintaining a roller in contact with the undersurface of the slack portion of said belt until the proper amount of belt-to-roller contact is obtained and rotating the roller about an axis substantially normal to a plane parallel to the path of travel of the slack portion of said belt whereby one end of the roller moves relative to the other and in the opposite direction of travel of said belt thereby causing said belt to shift laterally in the same general direction in which the said end of the roller was pointed prior to rotation. It will be readily appreciated that the invention provides a method and apparatus which may be used to align endless belts at a point where the stress levels in the belts art at a minimum.

It is to be understood that this invention is not limited to the exact embodiment of the device shown, it is merely by way of illustration and not limitation, as various other forms and modifications will be apparent to those skilled in the art and it is therefore intended that the appended claims cover all such changes and modifications.

What I claim is:

1. A method of aligning a continuous belt having a taut portion and a relatively slack portion comprising supporting spaced transverse segments of the slack portion of the belt in a manner such that each segment is positioned above the slack portion of the belt while retaining relatively slack portions therein and changing the direction of travel of said segments to return the belt to a desired path of travel.

2. A method of aligning a continuous belt having a taut portion and a relatively slack portion comprising supporting a plurality of spaced transverse segments of the slack portion of the belt in a manner such that each segment is positioned above the slack portion of the belt while retaining relatively slack portions therein sensing a departure of said belt from its intended path of travel, and changing the path of travel of said segments to return the belt to a desired path of travel.

3. In conveying apparatus, an endless belt having a taut portion and a relatively slack portion, means for supporting spaced transverse segments of the slack portion of the belt in a manner such that each segment is positioned above the slack portion of the belt while retaining relatively slack portions in said belt, and means for changing the direction of travel of said segments to return the belt to a desired path of travel.

4. In conveying apparatus, a continuous belt having a taut portion and a relatively slack portion, means for maintaining a roller positioned transversely with respect to the path of movement of the belt in contact with the undersurface of the slack portion of said belt so that a portion of the periphery of said roller is above a portion of the upper surface of the slack portion of said belt while retaining relatively slack portions in said belt, and means for rotating the roller about an axis substantially normal to a plane parallel to the path of travel of the slack portion of said belt and located intermediate of the ends of said roller whereby one end of the roller moves relative to the other and in the opposite direction of travel of said belt thereby causing said belt to shift laterally in the same general direction in which the said end of the roller was pointed prior to rotation thereof.

5. In conveying apparatus, a continuous belt having an upper flight in tension and a relatively slack lower flight, means for maintaining a plurality of spaced rollers positioned transversely to the path of movement of the belt in contact with the undersurface of the lower flight of said belt to the extent necessary to provide roller-to-belt contact between 40° and 115° of the periphery of each of said rollers while retaining relatively slack portions in said belt, means for sensing departure of said belt from its intended path of travel, and means for rotating simultaneously each of the rollers about an axis substantially normal to a plane parallel to the path of travel of the slack portion of said belt and located intermediate of the ends of each of said rollers whereby one of the ends of each of said rollers moves relative to the other end and in the opposite direction of travel of said belt thereby causing said belt to shift laterally in the same direction in which each said end of said rollers was pointed prior to rotation thereof.

6. In conveying apparatus, an endless belt having a taut portion and a relatively slack portion, a roller transversely positioned with respect to said slack portion, means mounting said roller in contact with the undersurface of said slack portion whereby at least a portion of the periphery of said roller is above a portion of the upper surface of the slack portion of said belt while retaining relatively slack portions in said belt, sensing means engageable with an edge of said belt, and actuating means connected to said sensing means and said roller for rotating said roller about a substantially vertical axis located intermediate of the ends of said roller.

7. In conveying apparatus, a continuous belt having an upper flight in tension and a relatively slack lower flight, at least two spaced rollers transversely positioned with respect to said lower flight, means mounting said rollers in contact with the undersurface of said lower flight, said rollers being generally urged against said belt until at least 40° of the periphery of each of said rollers is in substantially continuous contact with said belt while retaining relatively slack portions in said belt, sensing means engageable with an edge of said belt, and actuating means connected to said sensing means and said rollers for rotating said rollers about a substantially vertical axis located intermediate of the ends of said rollers.

8. In conveying apparatus, an endless belt having an upper flight in tension and a relative slack lower flight, a plurality of spaced rollers tranversely positioned with respect to said lower flight, means mounting said rollers in contact with the undersurface of said lower flight, said rollers being generally urged against said belt until between 40° and 115° of the periphery of each of said rollers is in substantially continuous contact with said belt while retaining relatively slack portions in said belt, sensing means engageable with an edge of said belt, and actuating means connected to said sensing means and said rollers for rotating said rollers about an axis substantially normal to a plane parallel to the path of travel of the slack portion of said belt and located intermediate of the ends of each of said rollers.

9. An apparatus as claimed in claim 8 in which said rollers are urged against said belt until between 65° through 90° of the periphery of each of said rollers is in substantially continuous contact with said belt.

10. Belt aligning apparatus for use in contact with the lower flight of a continuous belt, having an upper flight in tension and a relatively slack lower flight comprising a roller engageable with the undersurface of the lower flight of the belt to be aligned whereby a portion of the periphery of said roller may be positioned above a portion of the upper surface of the slack portion of said belt while retaining relatively slack portions in said belt, a pair of co-acting sensing means and actuating means connected to said sensing means and said roller for rotating said roller about a substantially vertical axis located intermediate of the ends of said roller, said means comprising a pair of pivotably mounted members and a pair of spaced-apart translatable members, one of each pivotably mounted members being connected to a respective one of said sensing means and a respective one of said translatable members, said roller being disposed between and supported by said translatable members.

11. Belt aligning apparatus for use in contact with the slack portion of a continuous belt having a taut portion and a relatively slack portion comprising a plurality of alignment rollers engageable with the undersurface of the slack portion of the belt to be aligned while retaining relatively slack portions in said belt, a pair of vertically disposed spaced-apart co-acting roller sensing means, and actuating means connected to said sensing means and said rollers for rotating said rollers about an axis substantially normal to a plane parallel with the path of travel of the slack portion of said belt located intermediate of the ends of said roller, said means comprising a pair of pivotably mounted members and a pair of spaced-apart translatable members, one of each pivotably mounted members being connected to a respective one of said roller sensing means and a respective one of said translatable members, said rollers being disposed between and supported by said translatable members, rotary movement of said pivotably mounted members effecting translatory movement of said translatable members in opposed directions.

12. Belt aligning apparatus for use in contact with the slack portion of a continuous belt having a taut portion and a relatively slack portion comprising a pair of spaced-apart translatable bars, means for supporting said bars, a plurality of spaced-apart alignment rollers disposed between and supported by said bars for rotation about an axis normal to a plane in which said rollers lie and located intermediate of the ends of each of said rollers, a pair of roller sensing means for sensing a departure of the belt from its intended path of travel, a connecting member interconnected to said roller sensing means such that the movement of one of said roller sensing means will effect a corresponding movement of the other, and a pair of pivotably mounted members one of each being connected to a respective one of said roller sensing means and a respective one of said translatable bars, the movement of one roller sensing means being transmitted through said pivotably mounted members and said translatable bars to the ends of said alignment rollers thereby causing translatory movement of said translatable bars in opposed directions and simultaneous rotatory movement of each of said alignment rollers about an axis substantially normal to a plane in which all said alignment rollers lie and located intermediate of the ends of each of said alignment rollers thereby effecting movement of one of the ends of each of said alignment rollers relative to the other end and in the opposite direction of travel of said belt resulting in said belt shifting laterally in the same general direction in which each said end of said alignment rollers was pointed prior to rotation thereof.

13. A method of aligning a continuous belt having a taut portion and a relatively slack portion comprising supporting a transverse segment of the slack portion of said belt so that the supported segment of the belt is above a portion of the upper surface of the slack portion of said belt while retaining relatively slack portions in said belt, sensing a departure of said belt from its intended path of travel, changing the angle of said supported transverse belt segment, and advancing said belt whereby said belt is caused to shift laterally.

14. A method of aligning a continuous belt having a taut portion and a relatively slack portion comprising supporting a transverse segment of the slack portion of said belt so that the supported segment of the belt is above a portion of the upper surface of the slack portion of said belt to provide a change in the path of travel of the slack portion of said belt about an arc of at least 40° while retaining relatively slack portions in said belt, sensing a departure of said belt from its intended path of travel, changing the angle of said supported tranverse belt segment, and advancing said belt whereby said belt is caused to shift laterally.

15. A method of aligning a continuous belt according to claim 14 in which the arc path of the belt is between about 40° and 115°.

16. A method of aligning a continuous belt according to claim 14 in which the arc path of the belt is between about 65° and 90°.

References Cited by the Examiner
UNITED STATES PATENTS

| 2,008,318 | 7/35 | Ziegler | 74—241 |
| 2,532,987 | 12/50 | Berndt | 74—241 |
| 2,751,067 | 6/56 | Nicholson | 74—241 X |

DON A. WAITE, *Primary Examiner.*

MILTON KAUFMAN, *Examiner.*